United States Patent [19]

Ibenthal et al.

[11] Patent Number: 5,850,262
[45] Date of Patent: Dec. 15, 1998

[54] METHOD OF FRACTAL IMAGE CODING AND ARRANGEMENTS FOR PERFORMING THE METHOD

[75] Inventors: Achim Ibenthal, Elmshorn; Detlef Götting, Hamburg; Rolf-Rainer Grigat, Halstenbek, all of Germany

[73] Assignee: U.S. Philips Corporation, N.Y, N.Y.

[21] Appl. No.: 838,481

[22] Filed: Apr. 7, 1997

[30] Foreign Application Priority Data

Apr. 19, 1996 [DE] Germany ........................ 196 15 490.1

[51] Int. Cl.[6] .................................... H04N 7/36
[52] U.S. Cl. .......................... 348/420; 348/416; 382/249
[58] Field of Search ................................... 348/420, 421, 348/402, 407, 413, 416, 431, 699; 382/249; H04N 7/36

[56] References Cited

U.S. PATENT DOCUMENTS

| | | | |
|---|---|---|---|
| 5,497,435 | 3/1996 | Berger ..................................... | 348/397 |
| 5,701,369 | 12/1997 | Moon ..................................... | 382/249 |
| 5,754,704 | 5/1998 | Barnsley ................................. | 382/249 |
| 5,767,911 | 6/1998 | Boon ...................................... | 348/409 |

OTHER PUBLICATIONS

A.E. Jacquin, "Image Coding Based on a Fractal Theory of Iterated Contractive Image Transformations", IEEE Transactions on Image Processing vol. 1 (1), pp. 18–30, Jan. 1992.

*Primary Examiner*—Howard Britton
*Attorney, Agent, or Firm*—Laurie E. Gathman

[57] ABSTRACT

To achieve an enhanced data reduction, a method of fractal image coding, in which method an image to be encoded is divided into range blocks which do not overlap and jointly cover the image contents completely, in which domain blocks comprising areas of the image contents in their original form or in a transformed form are generated from the image contents, and all areas of the image contents are covered by at least one domain block, for each range block the domain block most similar to the range block being searched, and the addresses of the domain blocks found as the most similar and possibly the transform functions used for their generation being transmitted instead of the data of the range blocks, is characterized in that, in a sequence of images, the fractal image coding performed exclusively within the images is only performed with basic images comprised in the image sequence at selectable time intervals, in that, for intermediate images provided between the basic images, the same range and domain block division is used as for the basic images, and in that, individually for each range block in a search area, that domain block is searched in an intermediate image which was found as the most similar in the previous image for the range block of the same position, and in that, if said domain block is found in the search area, the displacement vectors of this block relative to the domain block found as the most similar in the previous image are transmitted instead of the address and possibly the transform function.

9 Claims, 3 Drawing Sheets

METHOD OF FRACTAL IMAGE CODING AND ARRANGEMENTS FOR PERFORMING THE METHOD

BACKGROUND OF THE INVENTION

The invention relates to a method of fractal image coding, in which method an image to be encoded is divided into range blocks which do not overlap and jointly cover the image contents completely, in which domain blocks comprising areas of the image contents in their original form or in a transformed form are generated from the image contents and all areas of the image contents are covered by at least one domain block, for each range block the domain block most similar to the range block being searched, and the addresses of the domain blocks found as the most similar and possibly the transform functions used for their generation being transmitted instead of the data of the range blocks.

The invention also relates to encoders and decoders for performing the method.

Such a method of fractal image coding is known from "Image Coding Based on a Fractal Theory of Iterated Contractive Image Transformations", Arnaud E. Jacquin, IEEE Transactions on Image Processing, Vol. 1 (1), pp. 18–30, January 1992. In this method, each image to be coded is split up into so-called range blocks for which domain blocks are searched which can be imaged on the range blocks with a minimal deviation. The domain blocks are also formed from the image contents of the same image. In this known method, the search for a possibly similar domain block is individually performed in each image for each range block of the image. This requires, for each image, a complete coding of data of the same image. The data reduction consists of transmitting the address of the domain block found as the most similar in the image as well as possibly the transform function used for its generation, rather than transmitting the data of the range blocks, i.e. the image data as such. This known coding method is always based on domain blocks of the same image in which the range blocks are contained.

SUMMARY OF THE INVENTION

It is an object of the invention to improve this known method in such a way that an even higher data reduction is achieved.

According to the invention, this object is solved in that, in a sequence of images, the fractal image coding performed exclusively within the images is only performed with basic images comprised in the image sequence at selectable time intervals, in that, for intermediate images provided between the basic images, the same range and domain block division is used as for the basic images, and in that, individually for each range block in a search area, that domain block is searched in an intermediate image which was found as the most similar in the previous image for the range block of the same position, and in that, if said domain block is found in the search area, the displacement vectors of this block relative to the domain block found as the most similar in the previous image are transmitted instead of the address and possibly the transform function.

In fractal image compression, an image to be encoded is generally split up into so-called range blocks. The range blocks have an equal size, do not overlap and cover the complete image contents of the image. Moreover, so-called domain blocks are generated from the data of the image, which domain blocks preferably comprise more pixels than the range blocks. These domain blocks constitute a so-called domain pool. Each domain block may comprise image data of a given image area in their original, preferably also transformed form. This transform may be, for example, a rotation, an inversion, a reflection, etc. of the original image contents of this image area from which the domain block is generated. For generating different domain blocks, different transforms may be applied to an image area. This image area may thus occur in a transformed form in different domain blocks. As a result, the number of domain blocks is larger than the number of range blocks.

In the encoding process, the domain block whose image contents are most similar to the image contents of the range block is searched from the domain pool for each range block of the image. The size of the domain blocks may then have to be adapted to that of the range blocks. For each range block, the address of the domain block found as the most similar block and the transform function possibly used for its generation are determined. This is done individually for each range block. When the image has been encoded completely, a most similar domain block has thus been found for each range block of the image. Instead of transmitting the data of the range blocks themselves, the data of the domain blocks found as the most similar are transmitted. However, instead of transmitting the image values of these domain blocks, the addresses and the transform functions possibly used for their generation are transmitted. These data, which may be the fractal image compression data, have a clearly smaller data quantity than the pixel data of the range blocks of the entire image. This results in a considerable data reduction.

At the decoder end, the process is based on the same division of the image into range and domain blocks as at the encoder end. For each range block to be formed of the image to be restored, the data of the associated most similar domain block of this image are used for decoding the data. The address of this domain block has been transmitted. The data of this domain block are used as new data of the range block while using the transform function which may also have been transmitted. In this way, the data of each range block of the image are computed. Surprisingly, this process may start from an arbitrary starting image, i.e. for computing the range blocks, the data of those domain blocks of an image of arbitrary contents are used in a first step, whose addresses correspond to those domain blocks in the original image which were found as the most similar for the respective range blocks and whose addresses or transform functions were transmitted. The result is an image reconstructed from the data of the addressed domain blocks and the transform functions applied thereto. However, this image generated in a first step does not yet adequately correspond to the original image contents of the encoded image. The decoding process described above is repeated several times on this image which has been reconstructed in a first step. It is then important that, at each repetition of the computing process, the data of the previous process are used as starting data. Thus, the new data of the range blocks and the new data of the domain blocks of the image reconstructed, for example, in the first step are used for the next decoding step. In the next decoding step, the same procedure is followed so that the data of the domain block whose address has been transmitted, while possibly using the transform function, are generated for each range block. This process is repeated several times. The function system should be implemented in such a way that it converges. This means that the image contents of each range block of the image to be reconstructed become more and more similar to the original image contents, i.e. the image contents of the image before its encoding, upon every application of the described computing process during decoding. This iteration of the process may be interrupted when an adequate convergence has been achieved, i.e. when the image contents of the reconstructed image have become adequately similar to the image contents of the original image whose addresses and function system have been transmitted. As a result of the exclusive transmission of the addresses and possible transform functions of the domain blocks, a considerable data reduction is achieved because the pixel data of neither the range blocks nor the domain blocks have to be transmitted.

According to the invention, for achieving an even higher data reduction, the above-described fractal image coding oriented on the image data of an image is only performed for so-called basic images. In a sequence of images, these basic images are provided in a regular sequence at predetermined intervals. The encoding process for these images is performed in the way as described above, i.e. for each range block of a basic image, that domain block of the same basic image is searched which is maximally similar to the range block.

So-called intermediate images are provided between the basic images transmitted in the sequence of images. The same range and domain block division as for the basic images is used for these intermediate images.

However, for encoding the intermediate images, the circumstance that consecutive images often have similar image contents is utilized. In the prior-art method, only a so-called intraframe coding was performed, i.e. only data of the same images were used. A similarity of the image contents of consecutive images is not utilized. According to the invention, an interframe coding is performed during coding of the intermediate images, i.e. these similarities are utilized so as to achieve an even higher data compression.

According to the invention, the process is carried out in such a way that the domain block which was found as the most similar in the previous image for the range block of the same position is searched in a predetermined search area in an intermediate image for each range block individually. This process does not only utilize the circumstance that the image contents of consecutive images are often similar, but additionally, a given motion in the image contents is allowed. Image contents which are as such equal in the consecutive images but have moved are also found within the search area.

For example, if a domain block $y_1$ has been found as the most similar in a range block $x_1$ of an image $n_1$, the next image $n_2$ for the range block $x_2$ having the same position in this image as the range block $x_1$ in the image $n_1$, is searched for a domain block with the same image contents as the domain block $y_1$ of the image $n_1$. This search procedure is performed within the search area. If there is no motion, this domain block of the image $n_2$ will have the same position as the domain block $y_1$ of the image $n_1$. However, if there is motion, a different domain block is found in the search area, which domain block corresponds to the domain block $y_1$ in the image $n_1$, i.e. it has substantially similar contents but a slightly different position. In this case, only the displacement vectors of this domain block relative to the domain block found as the most similar in the previous image for the same range block are transmitted instead of the address and the transform function used during its generation. Thus, if such a domain block is found in the image $n_2$, which domain block has only quasi-changed its position relative to the domain block of the previous image, then the transmission of the address and particularly the transform function is not required. Only the displacement vectors associated with the corresponding domain block of the previous image are transmitted. An even higher data reduction is thereby achieved.

This search process is individually performed for each range block of an image, i.e. it may occur that for individual range blocks a coding of this type, in which only the displacement vectors are transmitted, succeeds, but that this does not succeed for other range blocks of the same image and, consequently, a coding in a normal form, i.e. by means of transmitting the address and the transform function of a domain block of the same image must be performed for these range blocks. Since consecutive images often have similar image contents, at least in image areas, a considerable data reduction is achieved in practice.

According to the invention, a brightness and/or contrast shift of the image contents of the domain blocks is performed and the search process is repeated in the search area if the domain block found as the most similar in the previous image for the range block at the same position is not found for a range block in the search area, and the displacement vectors and changes of the transform function of the domain block are transmitted if said domain block is found by means of the brightness and/or contrast shift.

In the above-described search process within the search area, a domain block is searched which substantially corresponds to the image contents of the domain block found as the most similar in the previous image. Actually, this would not be possible if, basically, the same image contents are provided but have a different brightness or a different contrast. This is the case when a given object moving in the image is subjected to varying illumination ratios. To be able to use the above-described enhanced data reduction in this case as well, the data of the domain blocks may be subjected to a brightness and/or contrast shift of the image. If this is done, and if the image contents are actually similar, but have only different brightness or contrast values, then a domain block found as the most similar for the same range block of the previous image will also be found in an intermediate image in this case. Also in the case of brightness or contrast shifts of the image contents, it will be possible for an increasing number of range blocks to transmit only the displacement vectors and the change of the transform function instead of the addresses and the full transform functions. This procedure may particularly be used in such a way that the most similar domain block is searched in the search area within the image, initially without using the brightness and/or contrast shift in the manner described above. If this domain block is not found, a brightness and/or contrast shift may be performed for the domain blocks. Subsequently, the search process in the search area is repeated with these changed domain blocks.

In accordance with a further embodiment of the invention, the search area is enlarged and the search process is repeated in the enlarged search area if the searched domain block is not found in the search area for the range block, even while performing the brightness and/or contrast shift of the image contents.

If the above-described two-step procedure, in which initially the unchanged domain block is searched in the search area and subsequently the domain block changed in brightness and/or contrast values is searched, remains unsuccessful, it is advantageously possible to additionally enlarge the search area and repeat the above-described search processes in the enlarged search area in a third step, which is initiated when the two previous steps have yielded no results.

In this case, an intraframe coding would be performed for a range block only when these three search steps have yielded no result, i.e. the most similar domain block would be searched within the same image and its address and transform functions would be transmitted.

In accordance with a further embodiment of the invention, those domain blocks which were found as the most similar in the previous image and in the subsequent image for the range block of the same position are individually searched in each search area in an intermediate image for each range block, and, if one of these domain blocks is found in the search areas, the displacement vectors of this domain block relative to the domain block found as the most similar in the previous or the subsequent image are transmitted instead of the transform function.

The above-described interframe coding may be performed in both directions, i.e. for range blocks of an image n, the domain blocks found as the most similar in the previous image n−1 and in the subsequent image n+1 may be searched in separate search areas. In this case, a similarity of the image contents is utilized, both for the previous and for the subsequent image. A similarity may occur in one of the images but not in the other. This leads to a further increase of the data compression.

The search area should be oriented on the maximal motion within the image. In accordance with an embodiment of the invention, the search area is chosen to be at least twice as large as the number of pixels covered by a motion in the image contents.

In accordance with a further embodiment of the invention, a basic image is provided in the image sequence at time intervals of at least one second. For another decoding process to be started, the waiting time is then limited to about one second, but an adequately large number of intermediate images is provided between the basic images, so that the data reduction yields high values.

In a further embodiment of the invention, an encoder for performing the method is characterized in that the domain blocks found for the range blocks and their displacement vectors are temporarily stored after an image has been encoded, so that they are available for encoding the subsequent image or for determining the displacement vectors.

To be able to perform the above-described interframe encoding, the data found for the previous image n must be temporarily stored when encoding an image n+1. This is effected by means of the memory from which the data of the image n can be read when encoding the image n+1, so that it can be examined whether the searched domain block in the image n+1 is found in the search area.

In a further embodiment of the invention, a decoder for performing the method is characterized in that a memory is provided in which the data transmitted for an image are temporarily stored after said image has been decoded, so that these data are available for decoding the subsequent image.

In a corresponding manner, a memory is also provided for the decoder in the decoding process, which memory maintains the data of the previous image available, so that they can be used for the interframe encoding process.

These and other aspects of the invention are apparent from and will be elucidated with reference to the embodiments described hereinafter.

DETAILED DESCRIPTION OF THE PREFERRED EMBODIMENTS

Figure 1:
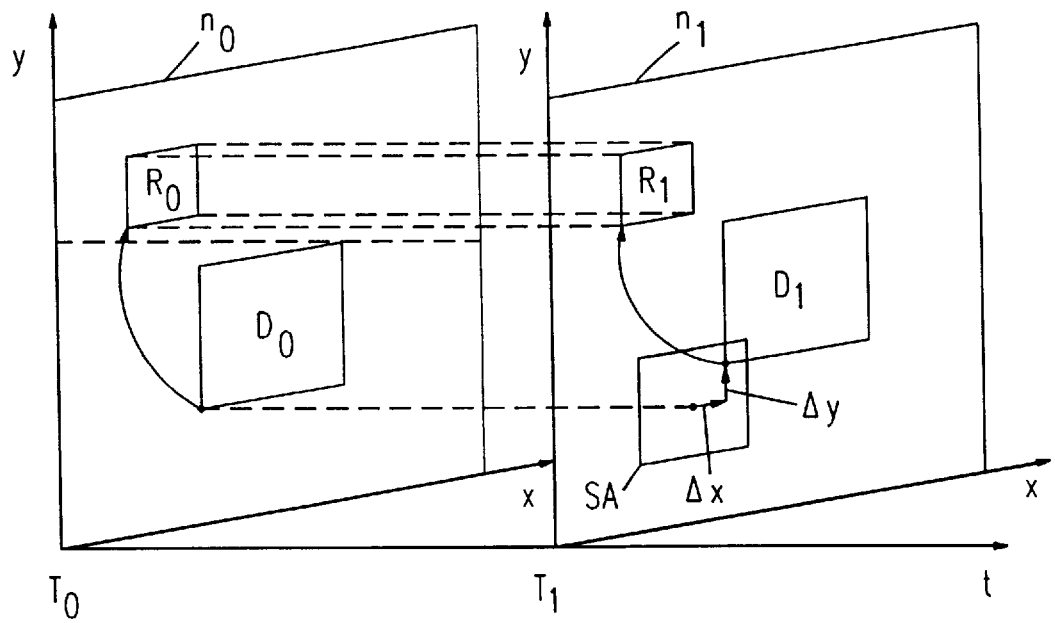
FIG. 1 shows diagrammatically the interframe encoding process according to the invention in fractal image compression for two consecutive images.

FIG. 1 shows diagrammatically two consecutive images $n_0$ and $n_1$, which are time-sequentially transmitted, the image $n_0$ being transmitted at an instant $T_0$ and the image $n_1$, being transmitted at an instant $T_1$.

The images are diagrammatically plotted on the x and y axes, with a range block R in the image $n_0$. For this range block, a domain block D also shown in image $n_0$ is found as the block which is most similar to the image contents of the range block R.

The image $n_0$ may be a basic image or an intermediate image. If a basic image is concerned, this domain block D has been found as being the most similar to the range block R in the search within the image $n_0$. If an intermediate image is concerned, this domain block D may have been found in a search area.

Such a search within a search area is further shown in FIG. 1 with reference to image $n_1$, which is an intermediate image.

In FIG. 1, a range block $R_1$ having the same position within the image $n_1$, as the range block $R_0$ within the image $n_0$ is shown diagrammatically within the image $n_1$.

For the range block $R_1$, that domain block which corresponds to the domain block $D_0$ in image $n_0$ is now searched in a search area SA, i.e. the domain block which is most similar to this block. If the image contents within the domain block $D_0$ from image $n_0$ to image $n_1$, have not moved, this domain block will be found at the same position in image $n_1$, as at the position in image $n_0$. However, in the embodiment shown in FIG. 1 it is assumed that the image contents in the image $n_1$ with respect to the image $n_0$ have completed a slight motion in the x direction as well as a slight motion in the y direction. In the search for the domain block within the search area SA, this block is consequently found again at a changed position in the image $n_1$. This changed position is denoted by means of the displacement vectors $\Delta x$ and $\Delta y$ in FIG. 1. The domain block $D_1$ found at this changed position has the same image contents as the domain block $D_0$ of the image $n_0$. Consequently, it is very similar to the range block $R_1$, likewise as the domain block $D_0$ is similar to the range block $R_0$ within the image $n_0$. According to the invention, the transform functions as well as the address of the domain block used for generating the domain block $D_1$ are therefore not transmitted, but only the displacement vectors $\Delta x$ and $\Delta y$ are transmitted to the decoder end. Based on these displacement vectors, that domain block $D_1$ which has a position shifted by the displacement vector with respect to the domain block $D_0$ of the image $n_0$ can be determined at the decoder end. The data of the domain block $D_1$ which can be found in this manner can thus be used at the decoder end for the reconstruction of the range block $R_1$.

Figure 2:
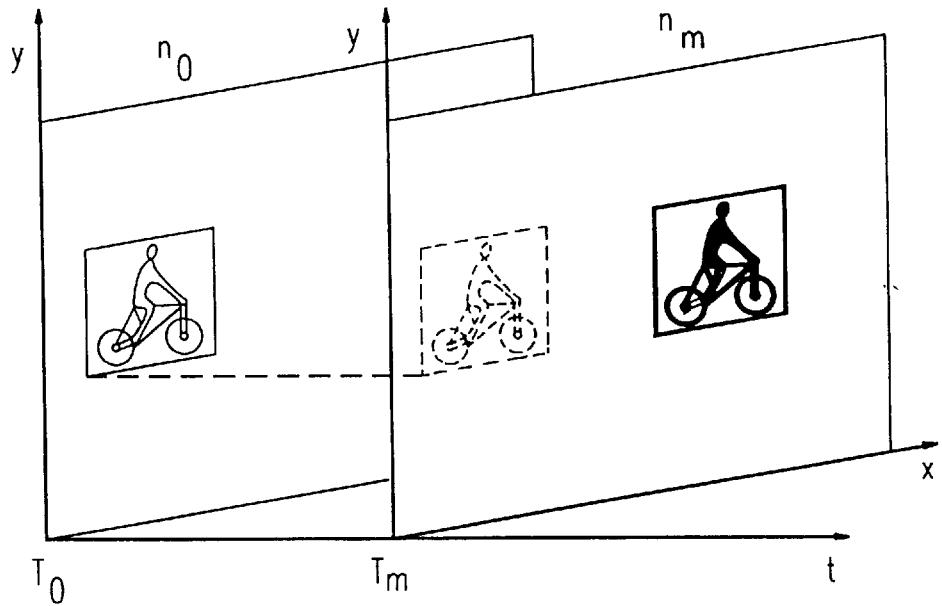
FIG. 2 is similar to FIG. 1, in which additionally a brightness and/or contrast shift of parts of the image contents is performed.

Similarly as in FIG. 1, FIG. 2 shows two consecutive images. In this case, an image $n_0$ and an image $n_m$ are concerned. A domain block can be found in the image $n_0$, for example, for a range block which is not shown in FIG. 2.

This domain block is shown in the drawing, with the figure of a cyclist as its image contents.

In the image $n_m$, which is an intermediate image, this cyclist may have covered a given distance, i.e. the position within the image has changed. The cyclist then appears in another domain block. In the manner described above, this domain block may basically be found within a search area so that the displacement vector of this domain block relative to the position of the domain block in the image $n_0$, which is shown in broken lines in the image $n_m$ is transmitted. However, an additional impediment may be that the cyclist appears in the domain block of the image $n_m$ in a different brightness and/or a different contrast, for example, due to a different illumination. This is illustrated by means of the darker figure of the cyclist in FIG. 2. In the above-described search within the search area not shown in FIG. 2, this domain block, which has the same image contents as the domain block of the image $n_0$ but a different brightness, would not be found. Consequently, a brightness and/or contrast shift may be additionally performed for the domain block of the image $n_m$. As a result, the changed brightness and/or contrast in which the cyclist is shown is compensated. Also for the example shown in FIG. 2, the darker figure of the cyclist in the domain block of the image $n_m$ would then be found as being similar to the image contents or substantially identical to the brighter figure of the cyclist in the domain block of the image $n_0$. In spite of different brightness and/or contrast values, the transmission of the address and the transform function of the domain block having a changed position in the intermediate image $n_m$ can also be refrained from in this case, and, in accordance with FIG. 1, only the displacement vectors that have occurred for the domain block of the image $n_m$ relative to the domain block of the image $n_0$ and the changes of the transform function are transmitted.

The above-described interframe encoding process, saving further data, will thus be possible for this range block. It is essential that the search process in accordance with FIG. 1 is initially performed with unchanged domain blocks. A brightness and/or contrast shift in accordance with FIG. 2 is only performed, when the searched domain block is not found within the search area. If this search neither yields any result, the search area may be enlarged. If this search is also without success, an intraframe encoding process may be performed in the conventional manner, i.e. the domain block which is most similar to the range block is searched within the image and its address and transform function are transmitted.

It is of course possible that not all of these three steps are provided, but that, for example, already after the first step, in which no displaced domain block is found for a range block in the smaller search area without any brightness and/or contrast shift, the intraframe encoding process can immediately be started. This may alternatively be done after the second step in which a brightness and/or contrast shift of the data of the domain blocks is performed.

Figure 3:
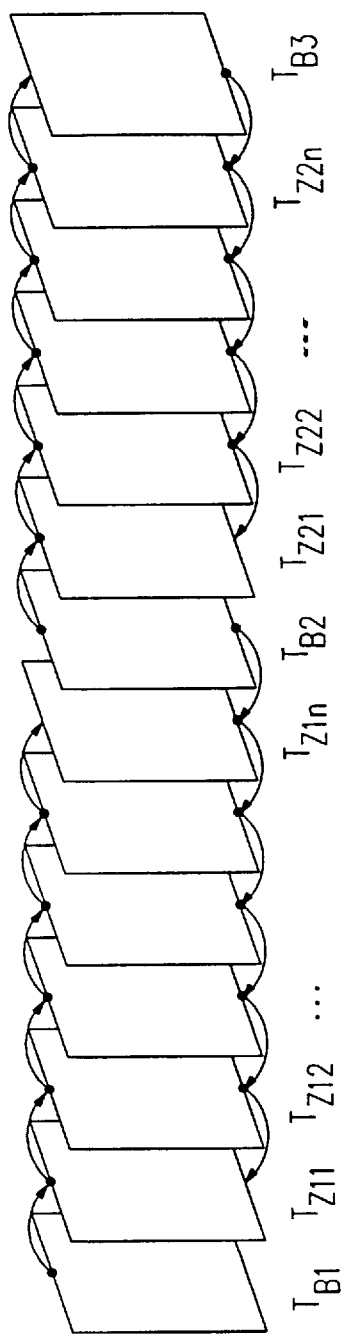
FIG. 3 shows diagrammatically some consecutive images, with a possible interframe encoding in both directions.

FIG. 3 shows diagrammatically a sequence of consecutive images. Basic images are denoted as $T_{B1}$, $T_{B2}$ and $T_{B3}$. The image sequence should be transmitted at least at intervals of about one second for each basic image. In FIG. 3, intermediate images $T_{Z11}$, $T_{Z12}$ to $T_{Z1n}$ and $T_{Z21}$, $T_{Z22}$ to $T_{Z2n}$ are shown diagrammatically between these basic images. An interframe encoding process in the manner described above may be performed in accordance with the invention for these intermediate images. Throughout the foregoing description, it was assumed that the data of the previous image n−1, i.e. the data of the image temporally transmitted previously, are used for an image n. Such an interframe encoding process is, however, also possible in a temporally reverse direction so that the data of the subsequently transmitted image n+1 are used for an image n. In this case, it is necessary to temporarily store the data of the images so that the data of the image n+1 are already available when encoding an image n.

FIG. 3 shows that, for example, for the intermediate images $T_{Z11}$ to $T_{Z1n}$ between the basic images $T_{B1}$ and $T_{B2}$ such an interframe encoding can be oriented on the image transmitted both beforehand and afterwards. An even higher data reduction is thereby achieved, because, for example, the image contents of the intermediate image $T_{Z11}$ may be very similar to the image contents of the image $T_{Z12}$ and thus shifted domain blocks are found, but may be different from the basic image $T_{B1}$, for example, due to a switch of the camera. In this case, the high data reduction can nevertheless be achieved by orienting the encoding process on the subsequent image.

Figure 4:
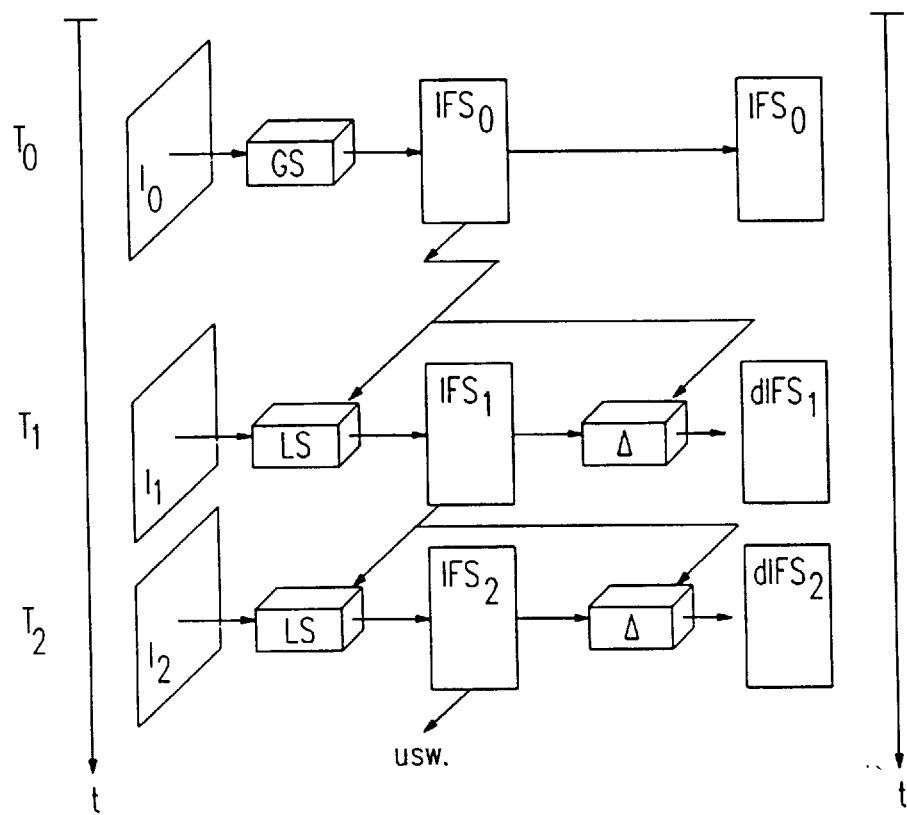
FIG. 4 shows diagrammatically an encoding process for a plurality of consecutive images, as can be performed in an encoder.

FIG. 4 shows diagrammatically how a fractal image compression in accordance with the method according to the invention can be performed at the encoder end. At the instant $T_0$, an image $I_0$ is transmitted, which is a basic image and for which a domain block is searched within the same image for each range block of this image, which domain block optimally represents the image contents of the range block, i.e. is most similar thereto. The search for these domain blocks, denoted by the function element GS in FIG. 3, leads to a function system $IFS_0$ which comprises the addresses, and possibly the transforms used for their generation, of the domain blocks found as the most similar blocks.

An intermediate image $I_1$ transmitted after this basic image is transmitted at an instant $T_1$. For the range blocks of this intermediate image, the above-described search for displaced domain blocks is performed first. This is realized by means of the function element LS. The function system $IFS_0$ of the previous image should be available for this search. It should therefore be temporarily stored in an encoder.

In the function element LS, the similar domain block is searched in the search area in accordance with the method described above. If the domain block is found for a range block, the displacement vectors are transmitted. It is also possible to further search after the further steps described above, in which a brightness and/or contrast shift as well as an enlargement of the search area is realized. If these searches neither have any result, an encoding within the image is performed. This process is performed individually for each range block of the image $I_1$.

If a displaced domain block is found in the search area, a corresponding new function system $IFS_1$ is generated which indicates the address and the transform function of this displaced domain block. To achieve the increased data reduction, this function system is, however, not transmitted. Instead, a computation of the displacement vectors of the found domain blocks of the image $I_1$, relative to those of the image $I_0$ is generated in the function block Δ. For those range blocks for which this search has succeeded, only the displacement vectors $dIFS_1$, are transmitted. For those range blocks for which this search has failed, the data $IFS_1$ are transmitted.

The search may also be performed in the two-step mode. In this mode, an additional search using brightness and/or contrast shift is performed, if the search of a domain block for a range block in the search area has failed. The search is repeated. If a domain block is found for the range block while shifting the brightness and/or contrast values, the displacement vectors $dIFS_1$ and the difference of the brightness/contrast values are transmitted. Here again, the data $IFS_1$ are transmitted for those range blocks for which this search has failed.

FIG. 4 shows a further encoding step for a subsequent image $I_2$ for which encoding the data of the function system $IFS_1$ of the previous image are used again. The process is performed in a corresponding manner for this image.

This encoding mode is repeated for each intermediate image until a basic image is transmitted again which will exclusively be intraframe-encoded.

FIG. 4 also shows the cause of the resultant data reduction. It resides in the fact that the complete function system $IFS_n$ does not always have to be transmitted for the intermediate images, particularly not for each range block. On the contrary, it is sufficient for the range blocks, for which a displaced domain block has been found, to transmit only the displacement vectors as $dIFS_n$.

An encoder may advantageously have the structure shown in FIG. 4, in each of which the function blocks indicated in FIG. 4 for encoding has to be provided only once. The encoding data of an image $I_x$ are temporarily stored in a memory (not shown in FIG. 4) for encoding the subsequent image $I_{x+1}$.

We claim:

1. A method of fractal image coding, in which method an image to be encoded is divided into range blocks which do not overlap and jointly cover the image contents completely, in which domain blocks comprising areas of the image contents in their original form or in a transformed form are generated from the image contents, and all areas of the image contents are covered by at least one domain block, for each range block the domain block most similar to the range block being searched, and the addresses of the domain blocks found as the most similar and possibly the transform functions used for their generation being transmitted instead of the data of the range blocks, characterized in that, in a sequence of images, the fractal image coding performed exclusively within the images is only performed with basic images comprised in the image sequence at selectable time intervals, in that, for intermediate images provided between the basic images, the same range and domain block division is used as for the basic images, and in that, individually for each range block in a search area, that domain block is searched in an intermediate image which was found as the most similar in the previous image for the range block of the same position, and in that, if said domain block is found in the search area, the displacement vectors of this block relative to the domain block found as the most similar in the previous image are transmitted instead of the address and possibly the transform function.

2. A method as claimed in claim 1, characterized in that a brightness and/or contrast shift of the image contents of the domain blocks is performed and the search process is repeated in the search area if the domain block found as the most similar in the previous image for the range block at the same position is not found for a range block in the search area, and in that the displacement vectors and changes of the transform functions of the domain block are transmitted if said domain block is found by means of the brightness and/or contrast shift.

3. A method as claimed in claim 1, characterized in that the search area is enlarged and the search process is repeated in the enlarged search area if the searched domain block is not found in the search area for the range block, even while performing the brightness and/or contrast shift of the image contents.

4. A method as claimed in claim 1, characterized in that the most similar domain block of the current image is searched for the relevant range block and its address and possibly the transform function used for its generation are transmitted if the search for the most similar domain block of the previous basic image fails for a range block.

5. A method as claimed in claim 1, characterized in that those domain blocks which were found as the most similar in the previous image and in the subsequent image for the range block of the same position are individually searched in each search area in an intermediate image for each range block, and in that, if one of these domain blocks is found in the search areas, the displacement vectors of this domain block relative to the domain block found as the most similar in the previous or the subsequent image are transmitted instead of the transform function.

6. A method as claimed in claim 1, characterized in that the search area is chosen to be at least twice as large as the number of pixels covered by a motion in the image contents.

7. A method as claimed in claim 1, characterized in that a basic image is provided in the image sequence at time intervals of at least one second.

8. An encoder for performing the method as claimed in claim 1, characterized in that the domain blocks found for the range blocks and their displacement vectors are temporarily stored after an image has been encoded, so that they are available for encoding the subsequent image or for determining the displacement vectors.

9. A decoder for performing the method as claimed in claim 1, characterized in that a memory is provided in which the data transmitted for an image are temporarily stored after said image has been decoded, so that said data are available for decoding the subsequent image.

* * * * *